(12) United States Patent
Rudduck et al.

(10) Patent No.: US 7,806,427 B2
(45) Date of Patent: Oct. 5, 2010

(54) FASTENER FOR AIR BAGS AND OTHER USES

(75) Inventors: Dickory Rudduck, Chicago, IL (US); Michael John Laybourne Hort, Sydney (AU); Adam Russell McArthur, Chicago, IL (US); Nicholas Anthony Ng, Chicago, IL (US); Geoffry David Sizer, Chicago, IL (US)

(73) Assignee: Telezygology Inc., Chicago, IL (US)

( * ) Notice: Subject to any disclaimer, the term of this patent is extended or adjusted under 35 U.S.C. 154(b) by 1133 days.

(21) Appl. No.: 10/550,814

(22) PCT Filed: Mar. 24, 2004

(86) PCT No.: PCT/AU2004/000371

§ 371 (c)(1),
(2), (4) Date: Mar. 30, 2006

(87) PCT Pub. No.: WO2004/085860

PCT Pub. Date: Oct. 7, 2004

(65) Prior Publication Data

US 2006/0202444 A1    Sep. 14, 2006

(30) Foreign Application Priority Data

Mar. 24, 2003 (AU) ............................... 2003901352
Oct. 15, 2003 (AU) ............................... 2003905644

(51) Int. Cl.
*B60R 21/16* (2006.01)
(52) U.S. Cl. .................... 280/728.2; 280/731; 292/256
(58) Field of Classification Search .............. 280/728.2, 280/731; 292/256
See application file for complete search history.

(56) References Cited

U.S. PATENT DOCUMENTS

| 5,160,233 A | 11/1992 | McKinnis |
| 5,207,544 A | 5/1993 | Yamamoto et al. |
| 5,380,037 A | 1/1995 | Worrell et al. |

(Continued)

FOREIGN PATENT DOCUMENTS

EP    1138558    10/2001

(Continued)

*Primary Examiner*—Eric Culbreth
(74) *Attorney, Agent, or Firm*—Heather A. Kartsounes

(57) ABSTRACT

The invention provides a fastener (10) for releasably securing a first element, such as an air bag (12) to a second element such as a bracket (14) located in a vehicle. Fastener (10) has a locking pin (16) which is movable between a locked position and a release position. Locking pin (16) has an engageable head (18). Fastener (10) includes clip (22) for engaging head (18). Locking pin (16) is biased to the release position, for example, by spring (26). Fastener (10) includes an actuator such as spring (32), comprising or including shape memory alloy and adapted to elongate upon application of appropriate energy. When spring (32) is elongated, it causes locking pin (16) to move to the release position. The invention also provides a fastener assembly (130) including at least one post (122) having a groove (124). Fastener assembly (130) includes a bar or latch, for example, in the form of wire (126) adapted to engage the groove (124). Attached to bar (126) is connecting means, such as shape memory spring (128). Upon application of suitable energy, spring (128) is adapted to change shape and draw bar (126) out of engagement with groove (124).

39 Claims, 12 Drawing Sheets

U.S. PATENT DOCUMENTS

| | | |
|---|---|---|
| 6,126,115 A | 10/2000 | Carrier et al. |
| 6,276,711 B1 | 8/2001 | Kurz et al. |
| 6,325,408 B1 | 12/2001 | Ford |
| 6,508,437 B1 | 1/2003 | Davis et al. |
| 2002/0084630 A1 | 7/2002 | Aulbach |

FOREIGN PATENT DOCUMENTS

| | | |
|---|---|---|
| EP | 1179457 | 7/2002 |
| GB | 2166185 | 4/1986 |

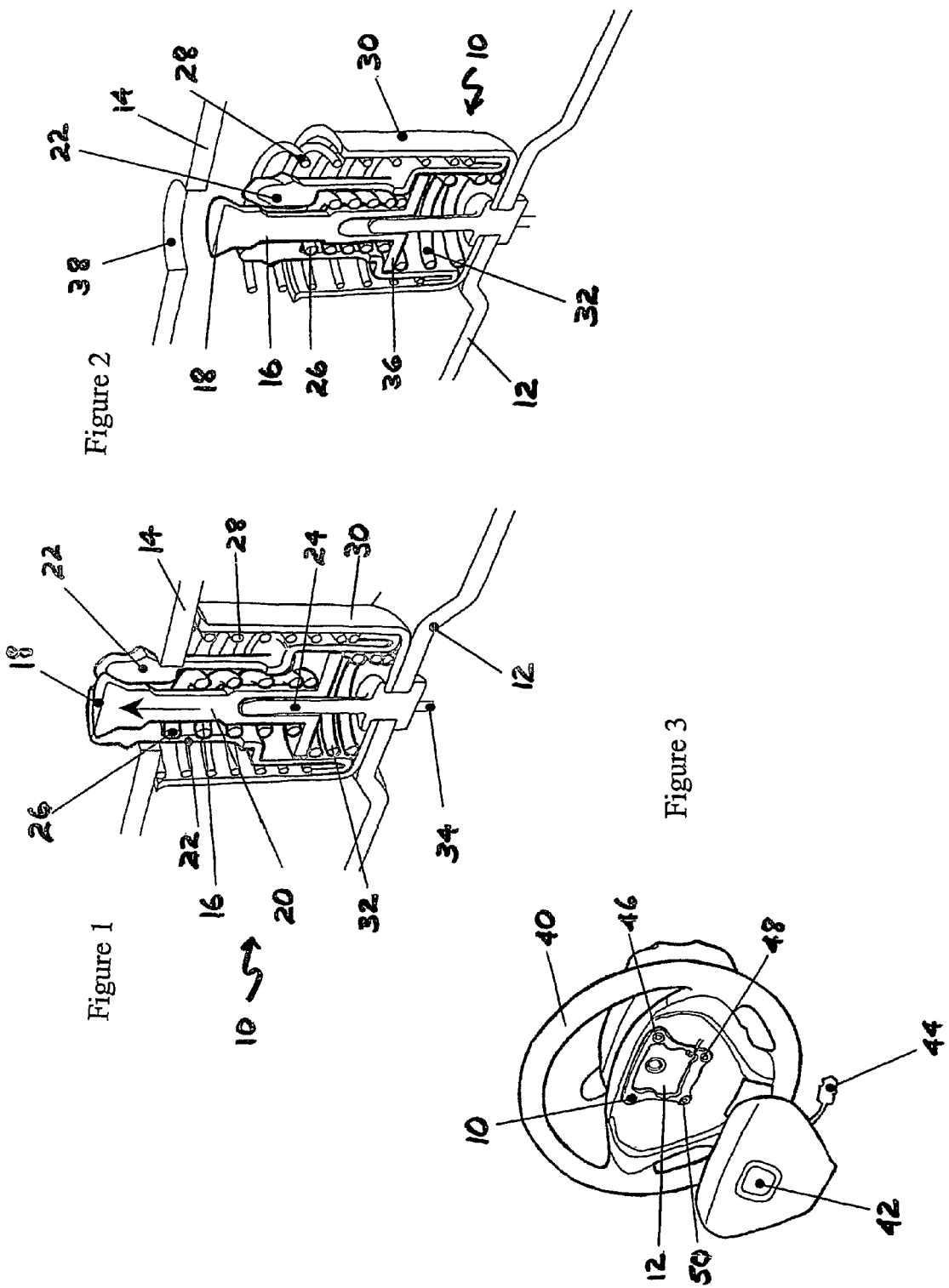

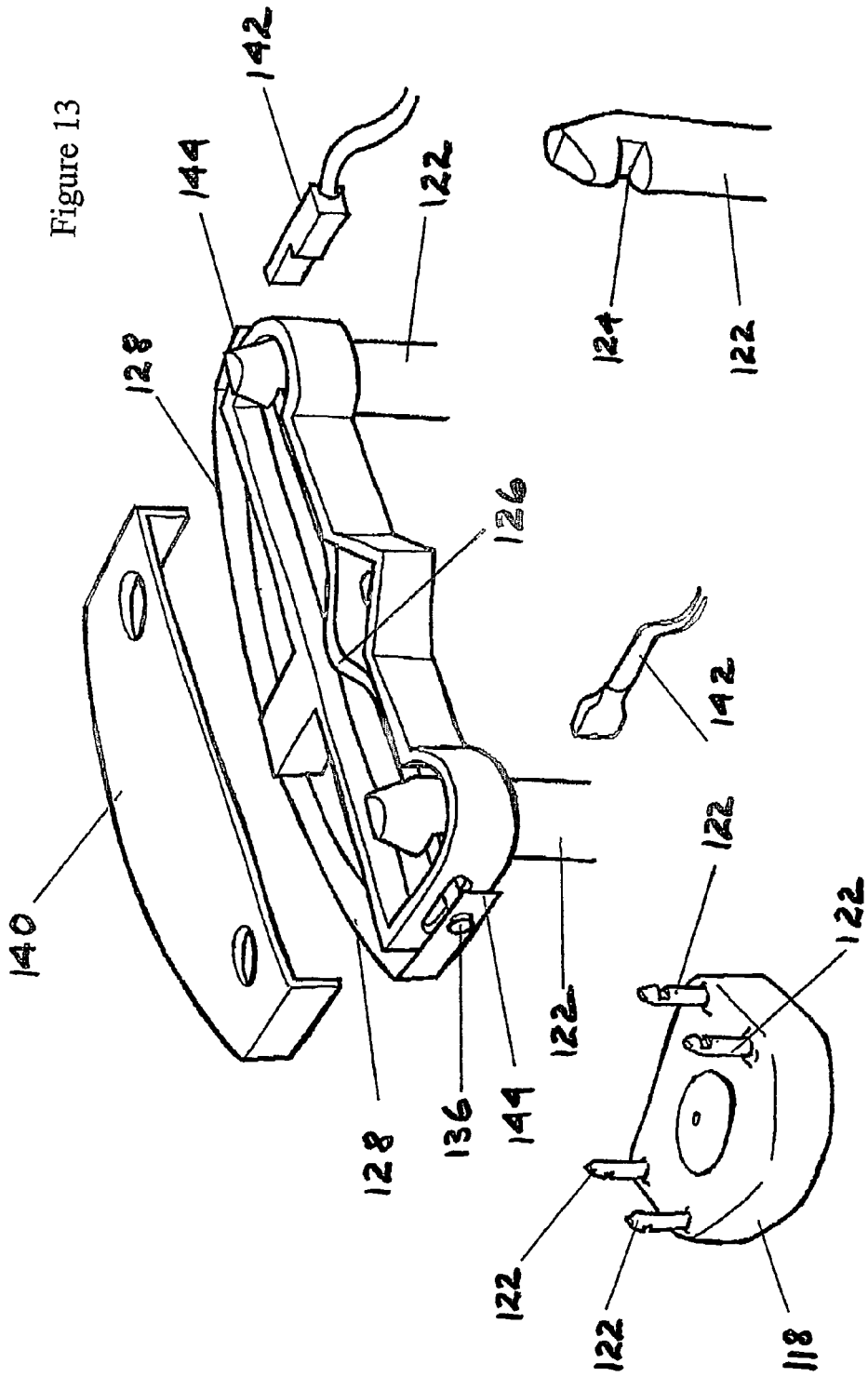

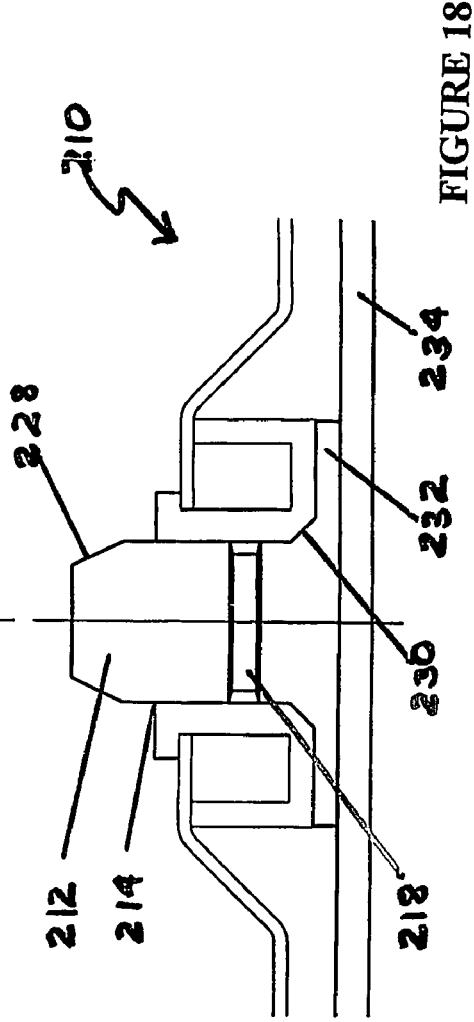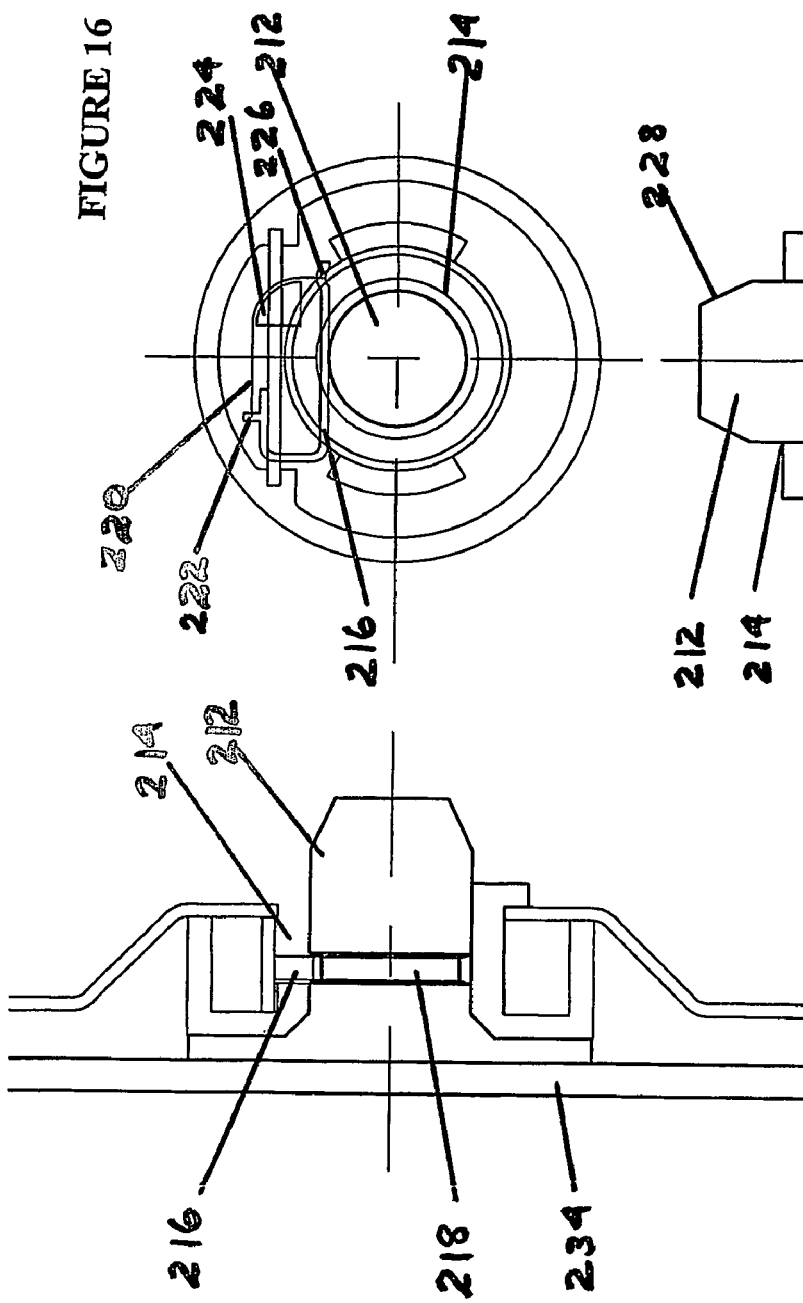

FASTENER FOR AIR BAGS AND OTHER USES

TECHNICAL FIELD

This invention concerns fasteners, especially fasteners for air bags in vehicles.

BACKGROUND ART

Air bags are often fitted to vehicles as a safety measure: an air bag is designed to inflate extremely rapidly, if triggered by a sufficiently serious impact, to cushion and protect an occupant from life-threatening injury.

The vehicle manufacturing industry has been fitting air bags to vehicles for several years. Usually, an air bag fitted on the driver's side of the vehicle is inserted in the steering wheel. Air bags may also be located elsewhere, for example, in the fascia in front of the front seat passenger, in door panels, in vehicle seats or backrests and in roof panels.

In an effort to prevent tampering with air bags, security screws are normally used to affix air bags and/or their covers in the vehicle. Unfortunately, air bag theft has become one of the fastest-growing automobile crimes, so it is apparent that security screws are inadequate. Most security screws have six-pointed star-shaped heads and require a special screwdriver to remove them. Once a thief has one of these special screwdrivers, which are available relatively freely, it is a simple task to steal an air bag by disconnecting the vehicle battery and removing up to four screws.

Air bags are also the targets of insurance fraud. Air bags which have not been deployed in an automobile crash may be removed illegally in the repair shop and replaced with a deployed bag. After inspection by an insurance assessor, the original air bag is replaced, and the insurer is billed for a new air bag. Alternately, an undeployed air bag may be pulled out from beneath its cover, so that it seems to have been deployed, then replaced after inspection with a black market air bag.

While there is a need for preventing unauthorised access to air bags, there is a continuing requirement to utilise fasteners which permit rapid assembly of the air bag to the vehicle during vehicle construction.

DISCLOSURE OF THE INVENTION

It is an object of the present invention to provide an air bag fastener which overcomes or at least alleviates some or all of the described problems. In particular, it is an aim of the invention, at least in some embodiments, to prevent unauthorised access to air bags, while facilitating rapid assembly.

Accordingly, in a first aspect, this invention provides a fastener for releaseably securing a first element to a second element in a spaced-apart relationship, the fastener including:

(a) a locking pin movable between a locked position in which the first element is secured in spaced relationship to the second element and a release position in which the first element is released from the second element, the locking pin having an engageable head;

(b) means for engaging the head of the locking pin with the second element;

(c) bias means urging the locking pin to the release position; and (d) an actuator comprising or including shape memory alloy adapted to elongate upon application of appropriate energy;

wherein the actuator is adapted, when elongated, to cause the locking pin to move to the release position.

It is preferred that the fastener includes an integrated processor, switch and one or more sensors. The sensors can carry out the function of sensing whether the locking pin is in the locked or release position.

The fastener of the invention is particularly suitable for retaining an air bag or other automotive component behind a fascia or other cover. In this situation, the first element may be a base to which the air bag is secured and the second element may be a fascia or cover.

The locking pin may be made of any suitable material but is preferably made of suitable polymeric material. If desired, the locking pin may have an internal cavity adapted to receive a guide pin. This can facilitate assembly of the fastener and help to maintain rigidity in situ.

In the locked position, the engageable head of the locking pin is engaged with the second element (such as a cover). The means for engaging the head of the locking pin with the second element may be of any suitable design. Preferably, the engaging means comprises or includes a clip. Such a clip may be annular, for example and may be in two or more (for example, four) parts. The clip is preferably of elastic material. Preferably, the engageable head of the locking pin engages the engagement means, such as a clip, the engagement holding the assembly in the locked position. Preferably, when the locking pin is moved to the release position, the head of the locking pin is disengaged from the engagement means. This may in turn permit the engagement means to be compressed and the assembly can pass through an aperture in the second element, thus releasing the second element from spaced relationship with the first element. In some embodiments, the fastener is assembled onto the first element.

The bias means urging the locking pin to the release position is preferably a coiled spring. In the release position the locking pin may to stand proud of the second element or may retreat below the second element.

The actuator is preferably a single coiled spring made of shape memory alloy. An example of this is sold as Nitinol, an alloy of nickel and titanium. This material has a crystalline transition temperature. When the material is heated past its crystalline transition temperature, it reverts to a memorised configuration. Thus, a coiled spring of Nitinol can be formed in a first configuration, in which the spring is relatively short, and revert to a memorised configuration, in which the spring is elongated, after heating. Heating is preferably provided by cabled connection between the actuator and an energy source, such as the battery of the vehicle. An external energy source may also be used. Preferably, there is a cable connection between the energy source and the actuator. However, it is within the scope of this invention that the energy is applied remotely, for example by use of an infra red beam or ultrasound.

It will be appreciated by one skilled in the art that the fastener of this invention may default to the locked position. It is only when energy is applied in a suitable manner that the fastener releases.

In the embodiment described in which the fastener of the invention has an actuator being a single coiled spring, the fastener may be described as "monostable". With this type of fastener, in the first place the fastener may be assembled to the first and second elements mechanically. Later, when appropriate, the application of suitable energy causes the fastener to release the second element from the first element.

As an alternative, the fastener may be bistable. This will usually require more than one actuator. In this embodiment, the application of suitable energy will release the fastener from the first and second elements, as set out above. This may involve one of the actuators. The application of suitable energy to another of the actuators may cause the fastener to secure the first and second elements in spaced relationship and to hold the first and second elements in that configuration once the application of energy has ceased.

In the case of the bistable fastener, as in the case of the monostable fastener, there may be no need to keep a supply of electrical current (or other energy) to the fastener in order to retain it in the locked position. However, if there is no such supply, it may be desirable to include a detent to hold the bistable fastener in the locked and/or released position. For example, the locking pin may include a groove into which a detent can clip when the fastener is unlocked, the detent providing sufficient interference to prevent the locking pin retreating towards the locked position, unless positively actuated.

The monostable fastener can be designed to release irreversibly, so that once release has taken place, the fastener must be replaced before an air bag can be mounted behind the fascia or cover. This can be useful to give and maintain a ready visual indication of tampering. Alternately, the fastener having a single actuator may be designed so that when the actuator cools, it reverts to the original configuration. The fastener assembly may then be pulled back into the locked position or it may be possible to mechanically assemble the fastener with the first and second elements, to the configuration existing before release.

In prior art fastener assemblies, there are usually two to four fasteners provided for each air bag. The fastener of the present invention may be designed to communicate with one, two or three (or more) "slave" fasteners. Thus, it may be necessary to provide an instruction via the energy source only to the "master" fastener which incorporates appropriate integrated electronics. When this fastener is caused to release, it can at the same time communicate with the other fastener or fasteners, causing them to release also.

The fastener of the invention preferably includes one or more sensors to sense and report on the status of the fastener, namely, whether the locking pin is in the locked or release position. Such a sensor preferably uses micro-switches which can be mechanically activated by the locking pin or an extension of the locking pin, for example.

Especially where the fastener is used to secure an air bag, it may be useful to include in the air bag assembly a sensor capable of sensing and reporting the presence or absence of the air bag. Such a sensor may be similar to that described above in relation to the fastener.

Encryption may be an important tool in preventing unauthorised access to the fastener of the invention. Preferably, each fastener of the invention is provided with an "address" so that a fastener to be released can be selected. Access to the "address" may be encrypted by using a simple or sophisticated key. Each fastener may also include means for enabling a fastener to "recognise" an authorised operator, requiring "handshake encryption".

Installation of air bags using the fastener of the invention and servicing/release of the air bags is preferably handled via computer communication from a technician to the vehicle. Most vehicles today include a computer in the form of an engine control unit (ECU) which operates a local interconnect network (LIN) to monitor and report on automobile units and to carry digital instructions to those units. The following embodiment describes installation and release of a fastener of the invention via the ECU. However, it is to be understood that the invention is not limited to this environment.

Four fasteners according to the invention are connected to a conventional bracket for an air bag and the air bag is attached to the bracket in the normal manner. The fasteners are connected to wiring for the air bag. A technician attaches a laptop to the ECU and checks that the air bag sensor has detected the presence of the air bag. The technician downloads from the fasteners the encryption and "status" codes, embedded in one of the fasteners, which will enable the air bag to be serviced or reassembled. The "status" codes indicate whether the fasteners are in the locked or release position.

Next, the air bag wiring is connected to the ECU via a conventional connection on the steering wheel. If the fasteners are supplied in the locked configuration, the technician instructs the fasteners to unlock via a software interface on the laptop. The air bag assembly is placed in the correct position on the steering wheel. Using the laptop, the technician instructs the fasteners to de-power, blind fastening the air bag in place.

The fastener "status" report—showing the fasteners are in the locked position—is updated, as is a history log.

At this stage, the air bag has been assembled to the vehicle. Assembly has taken place quickly and without the awkward assembly access frequently encountered in prior art situations. The air bag assembly does not have any fasteners which can be accessed by traditional means, reducing or eliminating the opportunity for theft of the air bag.

If an air bag is faulty or has been deployed after impact, the vehicle is taken to an authorised repair shop. Here a technician plugs a laptop into the ECU and downloads the appropriate information, including the status of the fasteners and the status of the air bag (present or absent). Optionally, the dialogue between the fasteners and the laptop recognises the authority of the laptop to operate the fasteners. Within a software interface on the laptop, the technician can instruct the fasteners to release. The ECU sends an electronic message to a controller chip mounted in the air bag or integrated into one of the fasteners. The controller chip, in turn, supplies the appropriate current from the vehicle's battery to the fastener or fasteners. The current supplies heat to the actuator which elongates and pushes the lock pin out of engagement with the second element. Access is then provided to the air bag.

It is also within the scope of this invention to provide a manual override if the actuator fails or if an energy source cannot be provided. The air bag assembly may carry on the first or second element an indicator, such as a moulded depression, into which a special tool may be pressed. The tool can pierce the air bag and push the lock pin to the unlocked position. This renders the air bag unusable so it can operate as a tamper evident mechanism.

In a second aspect, this invention provides a fastener assembly for releasably securing an element, the element including a post or pin having a groove, the assembly including a bar adapted to engage the groove to secure the element, the assembly also including a connecting means attached to the bar and consisting of or including shape memory material which, upon application of suitable energy, is adapted to change shape and draw the bar out of engagement with the groove, thus releasing the element.

Preferably, the element has more than one post or pin, each having a groove. The bar may engage the groove in more than one post or pin. In one embodiment, the bar engages the groove in each of two posts or pins. In the case of a fastener assembly for an air bag, preferably there are four posts and two fastener assemblies, each engaging the groove in two posts.

The post or pin may be chosen from a large range of suitable shapes. As one example, the pin may be generally circular in cross-section, tapering in from a flanged base and having a further taper in at the end remote from the flanged base. In this example, the pin may include a groove around its circumference. The groove may be adapted to receive one bar or a plurality of bars around the circumference of the groove. In this embodiment, the bar may comprise a latch engaged in the groove when the pin is locked and adapted to be moved out of engagement with the groove, and so unlock the pin, by a shape memory alloy wire which contracts when heated.

The pin or post may be formed integrally with or attached to the element to be fastened.

The material adapted to contract when activated is preferably shape memory alloy wire, as described in connection with the two embodiments above. Shape memory alloys are known and are usually made predominantly or wholly of titanium and nickel. They may also include other material, such as aluminium, zinc and copper. A shape memory alloy is capable of adopting one shape below a predetermined transition temperature and changing to a second shape once its temperature exceeds the transition temperature. Conversely, when the shape memory alloy cools below the transition temperature, it is capable of adopting the first shape again. In connection with the second aspect of the present invention, it is preferred that the shape memory alloy contracts (or straightens, as appropriate) when heated in situ.

The scope of the invention in the second aspect is not necessarily limited to the use of shape memory alloy. Other material may also be useful.

The connecting means is preferably in the form of shape memory wire of the type already discussed. However, it is particularly preferred that the shape memory material is a titanium-nickel wire which, when sufficient energy in the form of an electrical current is applied, heats to or above the temperature at which the material shrinks by 45%. It is preferred that the connecting means is attached to each end of the bar and, upon shrinking, draws the bar out of engagement with the groove.

The bar may need to be biased into engagement with the groove in the secured position.

The fastening system of this second aspect of the invention may be particularly suitable for fastening interior panels in automobiles. One example is the fastening of the interior lining of a door panel to the car door.

The invention in its various aspects will now be described in connection with certain non-limiting embodiments shown in the accompanying drawings.

BRIEF DESCRIPTION OF THE DRAWINGS

In the drawings:

FIG. 1 is a sectional, perspective view of a first embodiment of a fastener according to the first aspect of the invention, showing the locking pin in the locked position;

FIG. 2 is a similar view of the fastener of FIG. 1, showing the locking pin in the release position;

FIG. 3 is a perspective view of an air bag module during assembly to a steering wheel, using the fastener of the invention;

FIG. 13 is a perspective view of the fastener assembly of FIG. 12 in situ securing two elements, partly in exploded view;

FIG. 14 is a perspective view of one of the posts shown in FIG. 13;

FIG. 15 is a perspective view of an element having four posts as in FIG. 14, FIG. 15 being in reduced scale compared to FIGS. 13 and 14;

FIG. 16 is a plan view transparent as to some detail, of a second embodiment of fastener assembly of the invention in its second aspect;

FIG. 17 is a side elevation of the embodiment in FIG. 16; and

FIG. 18 is an end elevation of the embodiment in FIG. 16.

BEST MODES FOR CARRYING OUT THE INVENTION

Figure 4:
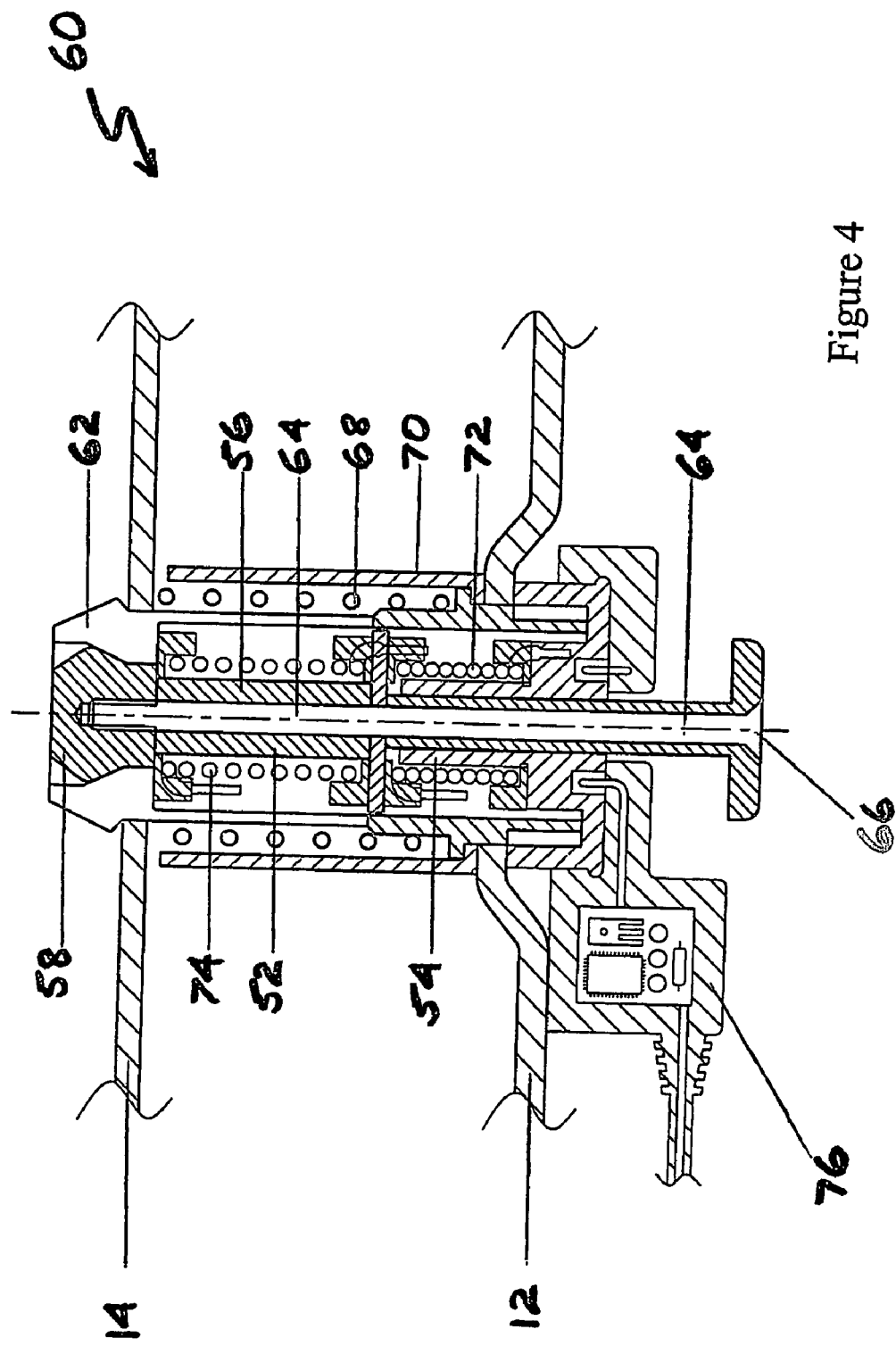
FIG. 4 is a cross sectional view of a second embodiment of the fastener of the invention.

Referring first to FIGS. 1 and 2, fastener 10 releasably secures air bag bracket 12 to bracket 14 located on the steering wheel of a vehicle. Fastener 10 has a locking pin 16 which is movable between the locked position shown in FIG. 1 and the release position shown in FIG. 2. In the locked position shown in FIG. 1, bracket 14 is held in spaced relationship with air bag bracket 12. As can be seen from FIG. 2, when locking pin 16 is in the release position, air bag bracket 12 is no longer held in spaced relationship with bracket 14.

Locking pin 16 includes head 18 being of larger dimension than shaft 20 of locking pin 16. In the locked position, head 18 engages clip 22. The engagement between head 18 and clip 22, together with guide pin 24, hold locking pin 16 in the configuration shown in FIG. 1.

Locking pin 16 is biased towards guide pin 24 by spring 26. A second spring 28 acts as an ejector when head 18 is released from clip 22. Spring 28 sits within outer sleeve 30.

Spring 32, of shape memory alloy, is the actuator for releasing fastener 10. Actuator spring 32 communicates via ECU cable attachment point 34 with the vehicle's power source (the battery). When energy supplied by the battery (not shown) causes actuator spring 32 to heat above its crystalline transition temperature, spring 32 expands to the configuration shown in FIG. 2, bearing on plate 36 and pushing locking pin 16 upwardly against the bias of spring 26. Once head 18 has been pushed above clip 22, clip 22, being made of resilient material, can deflect inwardly and both clip 22 and head 28 are free to be ejected below bracket 14, under the influence of ejector spring 28, to assume the release configuration shown in FIG. 2.

The size of cavity 38 in bracket 14 is chosen to prevent release of fastener 10 when head 18 engages clip 22 and to permit both head 18 and clip 22 to pass through when there is no such engagement.

Fastener 10 is shown in situ in FIG. 3, attached to air bag bracket 12 on vehicle steering wheel 40. An air bag (not shown) is mounted behind cover 42. The interface between cable attachment port 34 and the vehicle ECU is effected through electronics link 44.

In the configuration shown in FIG. 3, fastener 10 is an intelligent fastener which is linked to three slave fasteners to be inserted in apertures 46, 48 and 50. When fastener 10 is actuated, it communicates with the slave fasteners so that they are also released.

Preferably, there is also mounted on air bag bracket 12 one or more sensors to sense whether the air bag is present or absent. The choice of suitable sensor will be apparent to one skilled in the art. The sensor or sensors may be part of cover 42 instead of on air bag bracket 12, as desired.

The embodiment illustrated in FIGS. 1 and 2 is monostable in that there is a single actuating spring 32 and, when heated, this spring expands or elongates to release the fastener.

The second embodiment illustrated in FIG. 4 is a bistable version of the fastener of the invention. In this Figure, fastener 60 once again holds air bag bracket 12 in spaced relationship with steering wheel bracket 14. Locking pin 56 includes hear 58 designed to engage with clip 62. In this embodiment, however, there is no guide pin. Instead locking pin 56, has, besides head 58, upper shaft 52, and lower shaft 54. Cavity 64 journaled into and through each of lower shaft 54 and upper shaft 52 and part way into head 58 allows for manual release of fastener 60. Insertion of a thin tool of sufficient length through aperture 66 along the length of cavity 64 and pressure on head 58 can cause head 58 to be popped clear of clip 62, allowing clip 62 to fold in as in the embodiment in FIGS. 1 and 2.

Like the embodiment in FIGS. 1 and 2, fastener 60 includes ejector spring 68 within sleeve 70. However, there is no bias spring 26 in fastener 60. Instead, fastener 60 has two shape memory springs 72 and 74. Actuator spring 72 carries out the same role as actuator spring 32 in the case of fastener 10. Actuator spring 74, once actuated through heat when fastener 60 is in the release position, expands to push head 58 into engagement with clip 62 and to secure steering wheel bracket 14 in spaced relationship with air bag bracket 12.

Figure 5:
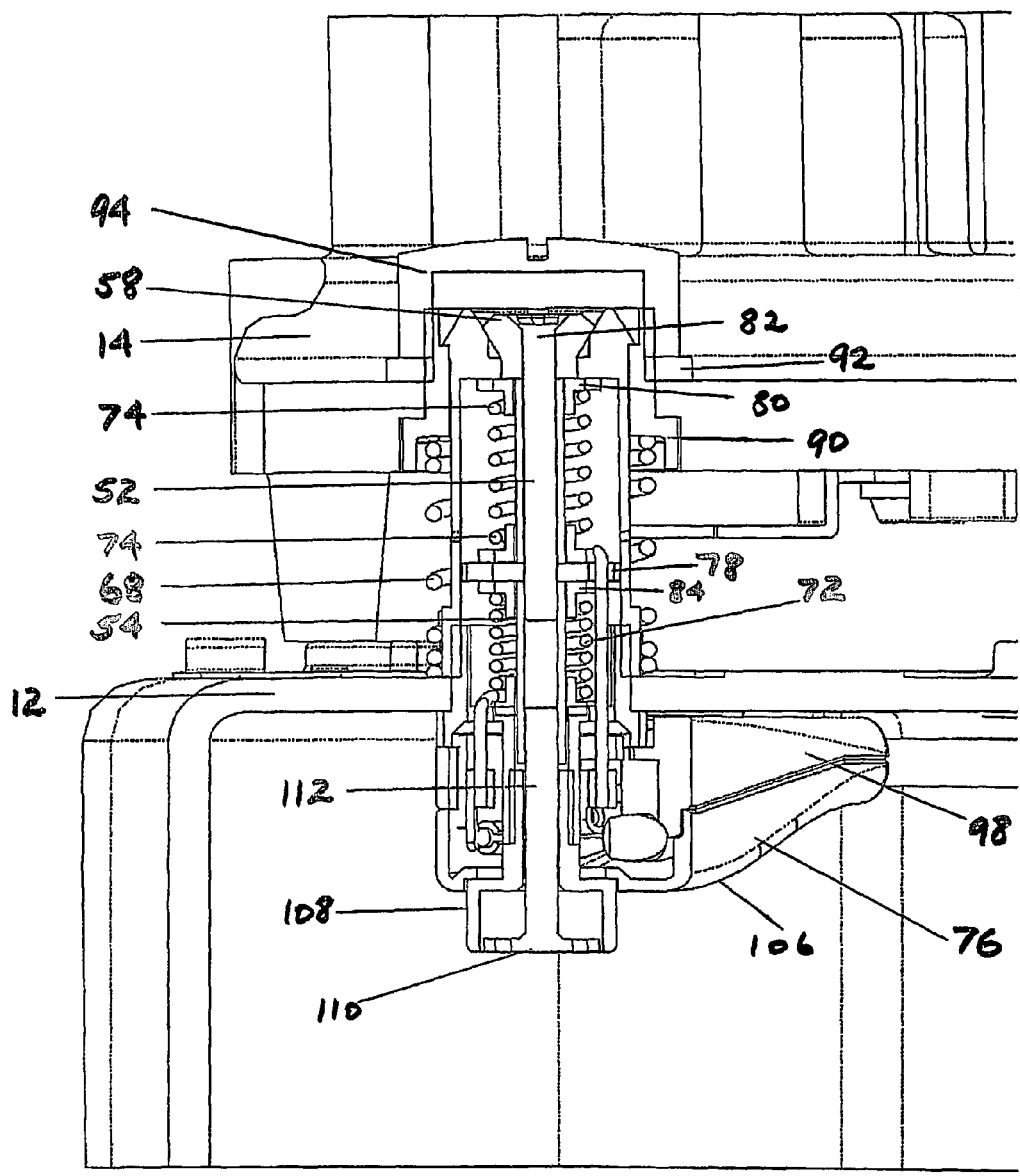
FIG. 5 is a cross sectional view of a further embodiment of the fastener of the first aspect of the invention, similar to that in FIG. 4, but showing the fastener in situ between an air bag molding and a steering wheel casting.

Fastener 60 is shown with clip-on electronics controller 76, which communicates with the vehicle's ECU. FIG. 5 is very similar to that FIG. 4 and the same numerals are used to indicate the same components.

In FIG. 5, clip-on electronic controller 76 is shown on the right hand side of the Figure rather than on the left as in FIG. 4.

Figure 6:
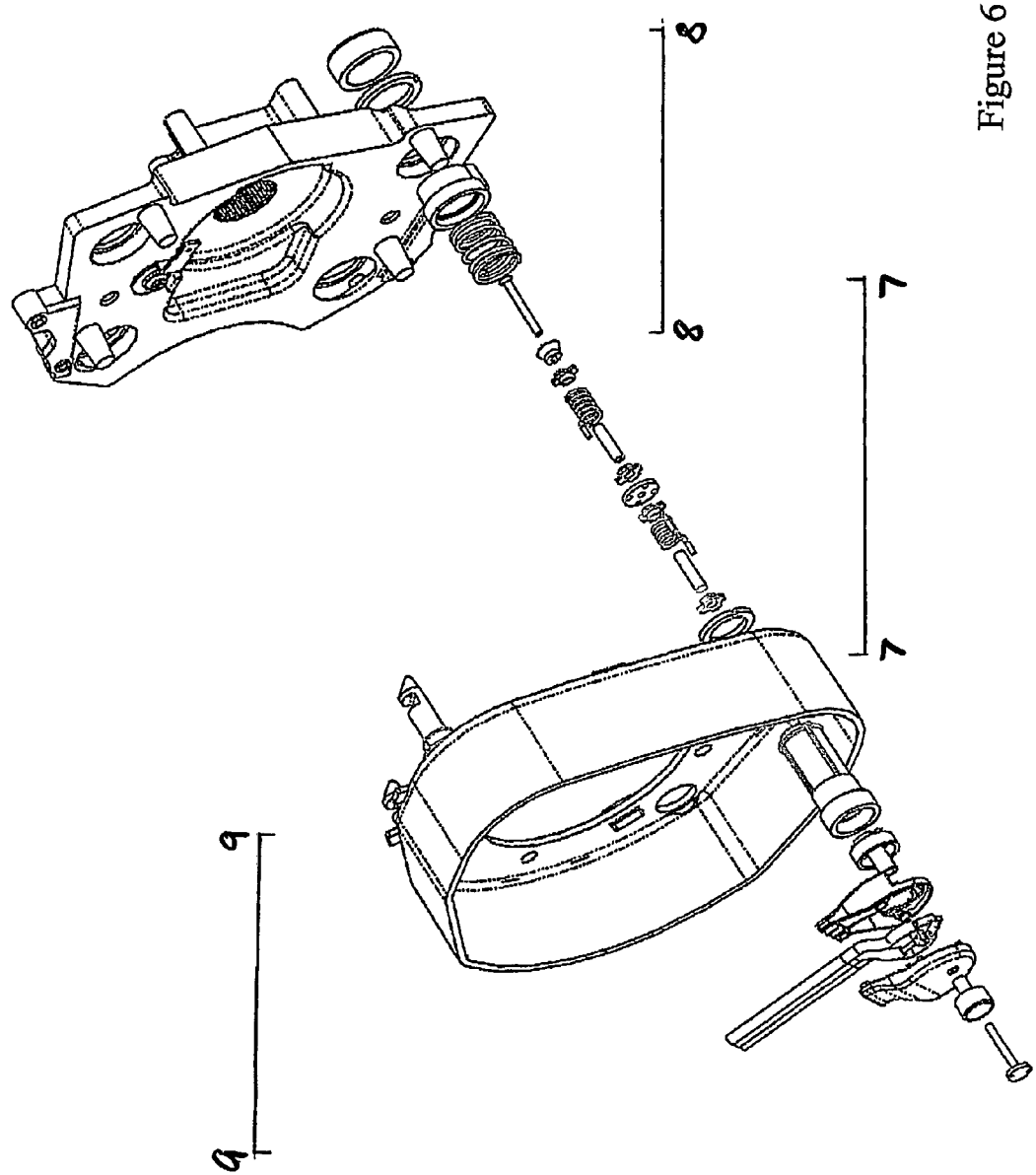
FIG. 6 is an exploded view of the assembly of FIG. 5.
Figure 7:
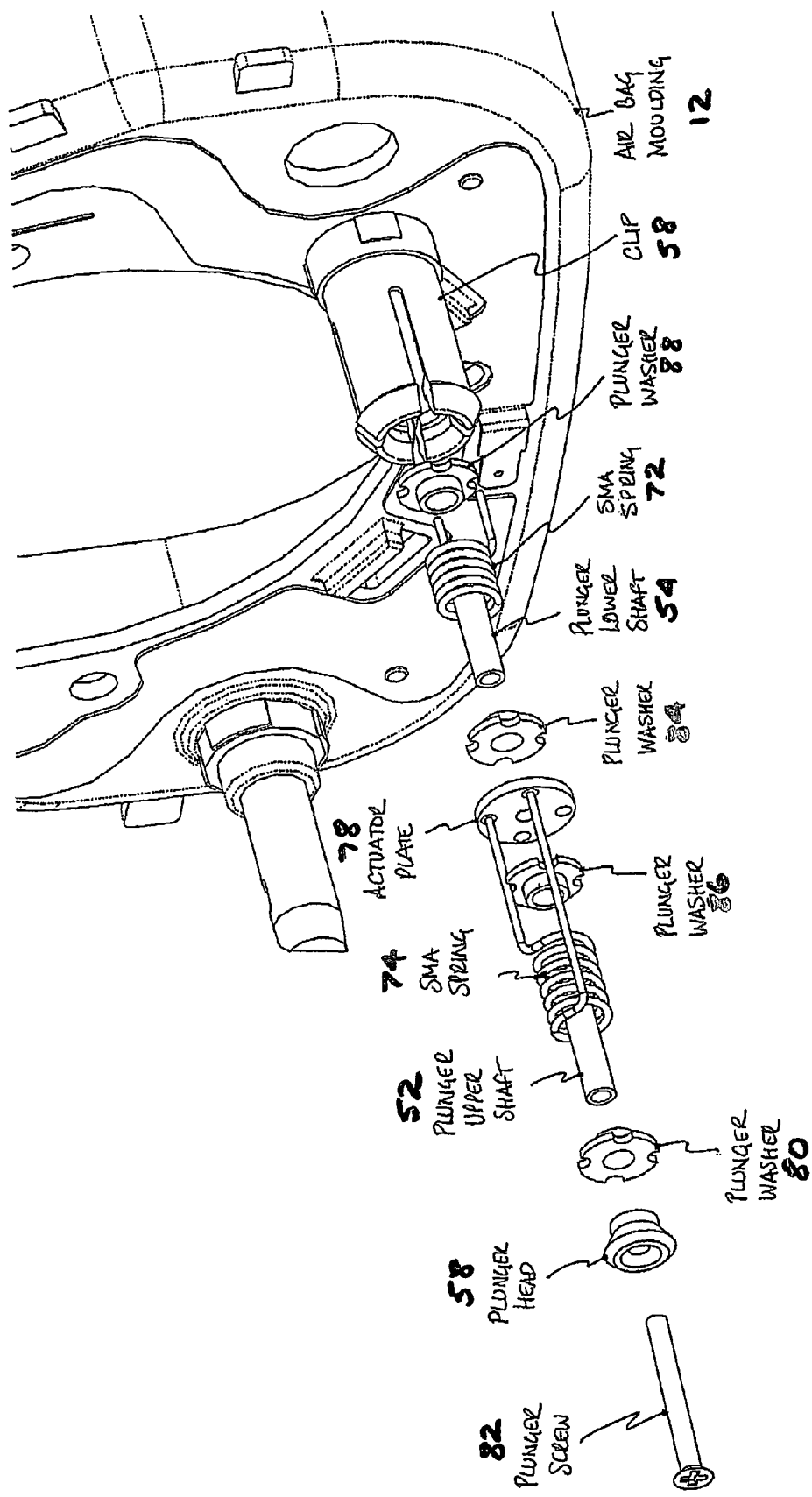
FIG. 7 shows in larger scale and in reverse configuration the portion of FIG. 6 marked 7-7.
Figure 8:
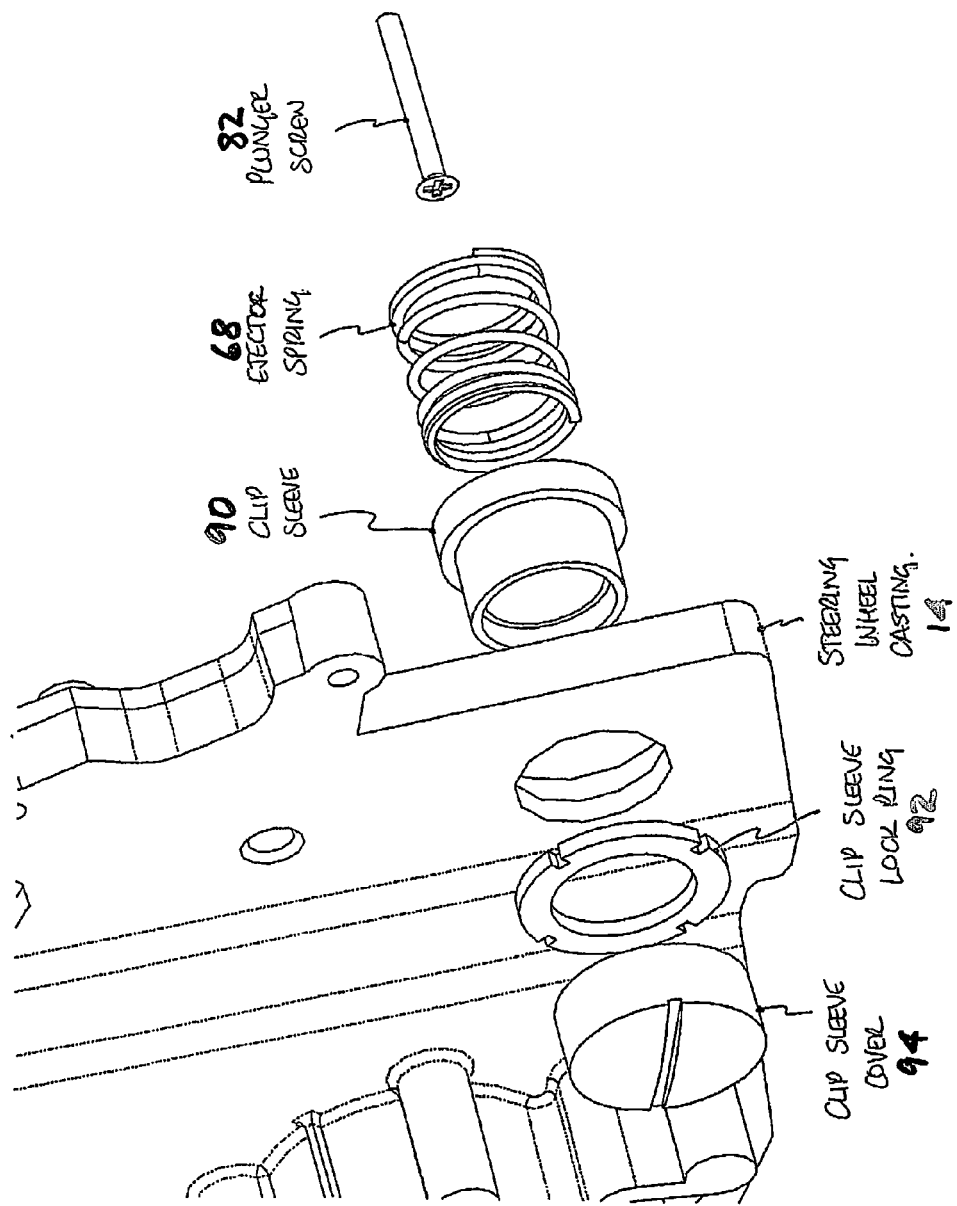
FIG. 8 shows in larger scale and in reverse configuration the portion of FIG. 6 marked 8-8.
Figure 9:
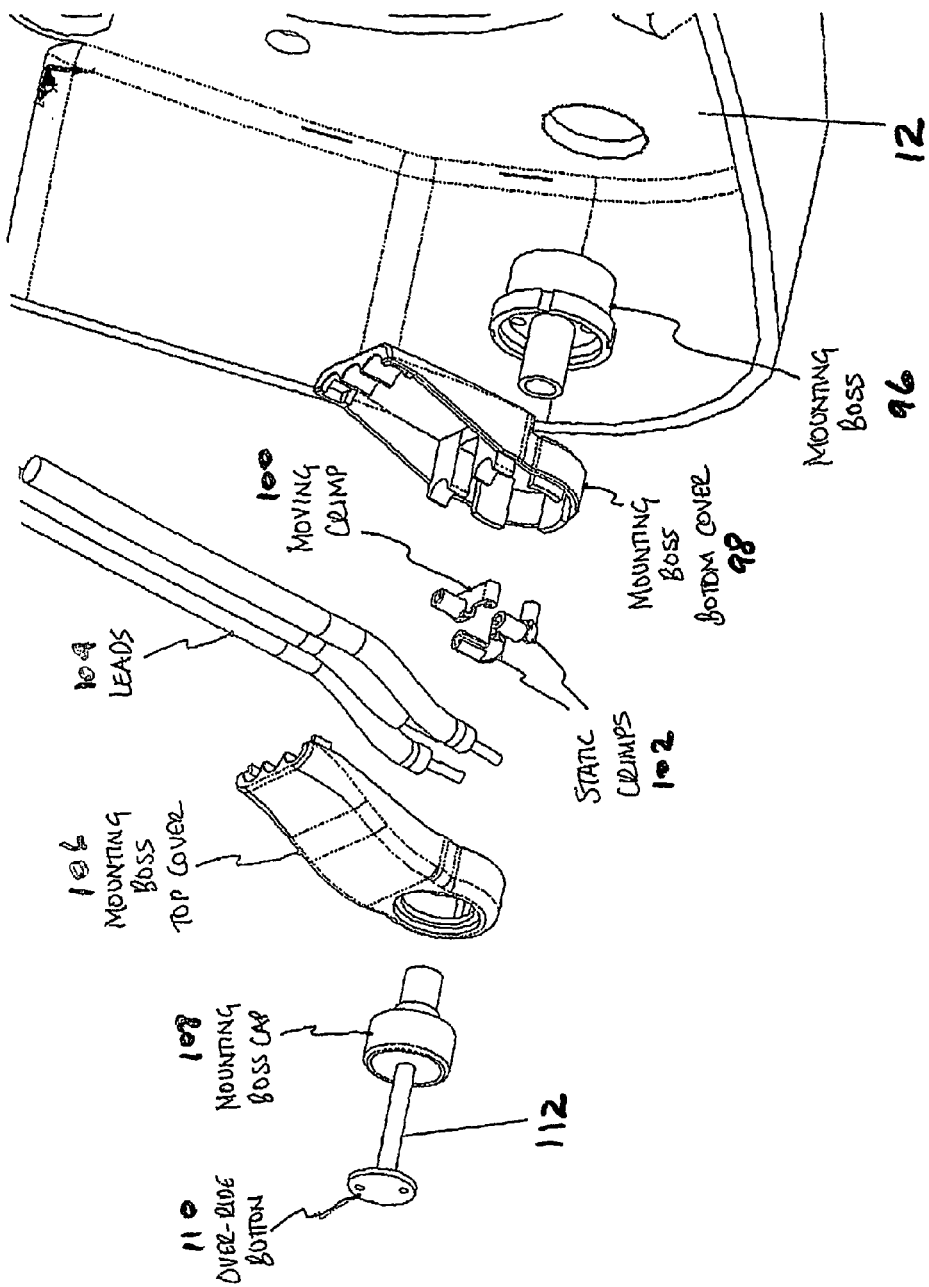
FIG. 9 is a similar view of the area marked 9-9 on FIG. 6.

The fastener of FIG. 5 is that shown in exploded view in FIGS. 6, 7, 8 and 9. Larger scale views of the areas marked appropriately in FIG. 6 are illustrated in FIGS. 7, 8 and 9. For ease of reference, there is overlap between FIGS. 7 and 8. It will be noted that the screw shown on the left hand side of FIG. 7 is repeated on the right hand side of FIG. 8. It is also to be noted that in FIG. 7 some of the components shown have not been "exploded" to the extent illustrated in FIG. 6.

In FIG. 7, clip 58 is shown mounted on air bag molding 12. Plunger washer 88 is located at the base of shape memory alloy spring 72, assembled around lower shaft 54. Actuator plate 78, when assembled, is sandwiched between washer 84 and washer 86. Shape memory alloy spring 74 is assembled around upper shaft 52. Washer 80 is inserted between upper shaft 52 and head 58, into which screw 82 is inserted.

Turning now to FIG. 8, where screw 82 is repeated to show continuity from FIG. 7, one end of ejector spring 68 fits within the wider portion of clip sleeve 90. Also shown in FIG. 8 are clip sleeve lock ring 92 and clip sleeve cover 94.

FIG. 9 shows the components of clip-on electronic controller 76, illustrated in the lower part of FIG. 5. It will be seen that the assembly includes mounting boss 96, with bottom cover 98 and top cover 106 enclosing crimps 100 and 102 and leads 104. Override button 110 is received in mounting boss cap 108 and is integral with shaft 112 which is fitted into lower shaft 54 (which, in this embodiment, takes the form of a sleeve).

Figure 10:
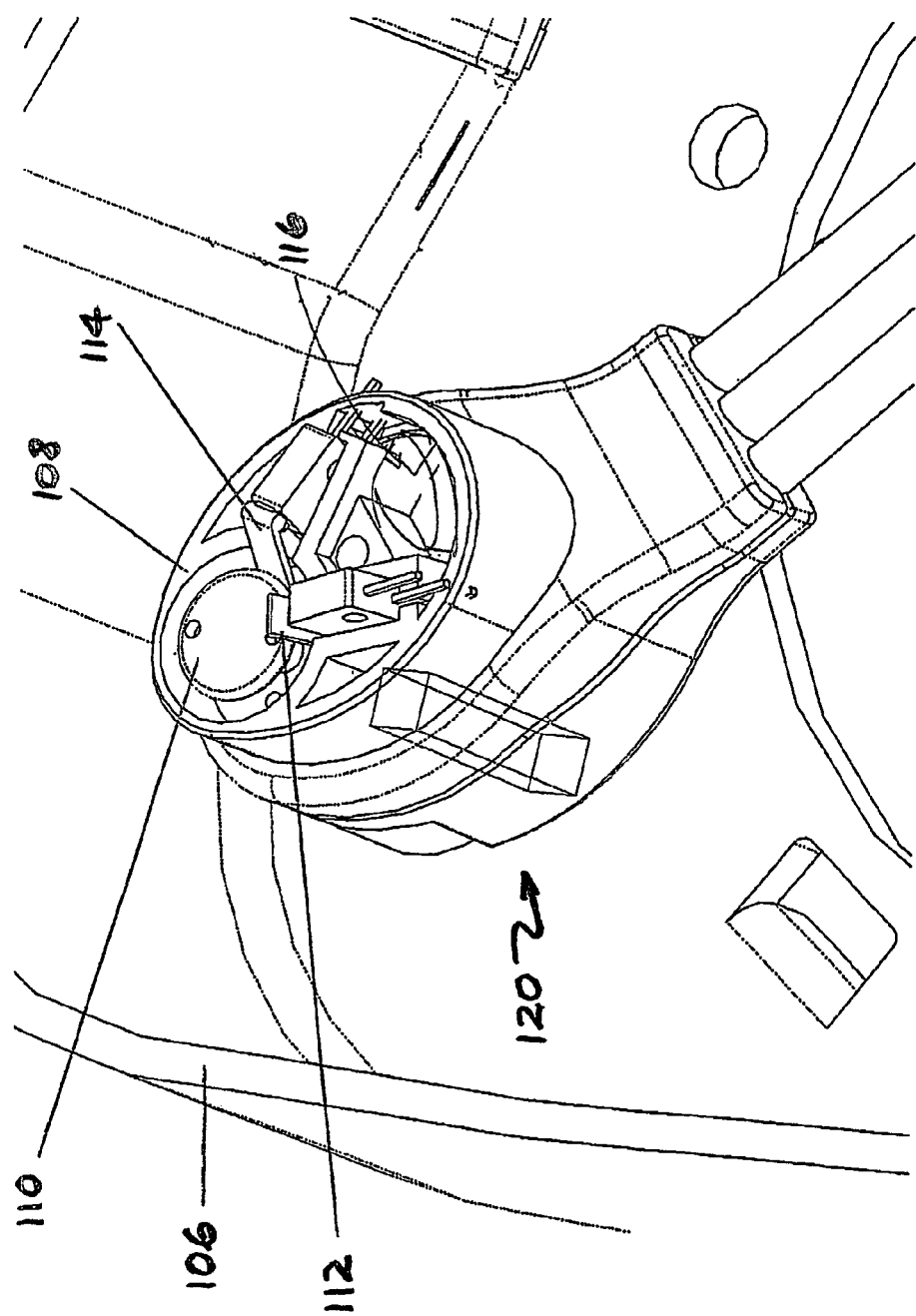
FIG. 10 is a substantially enlarged, partly diagrammatic, perspective view from below of a micro switch assembly connected to override button 110 which is shown in FIG. 5.
Figure 11:
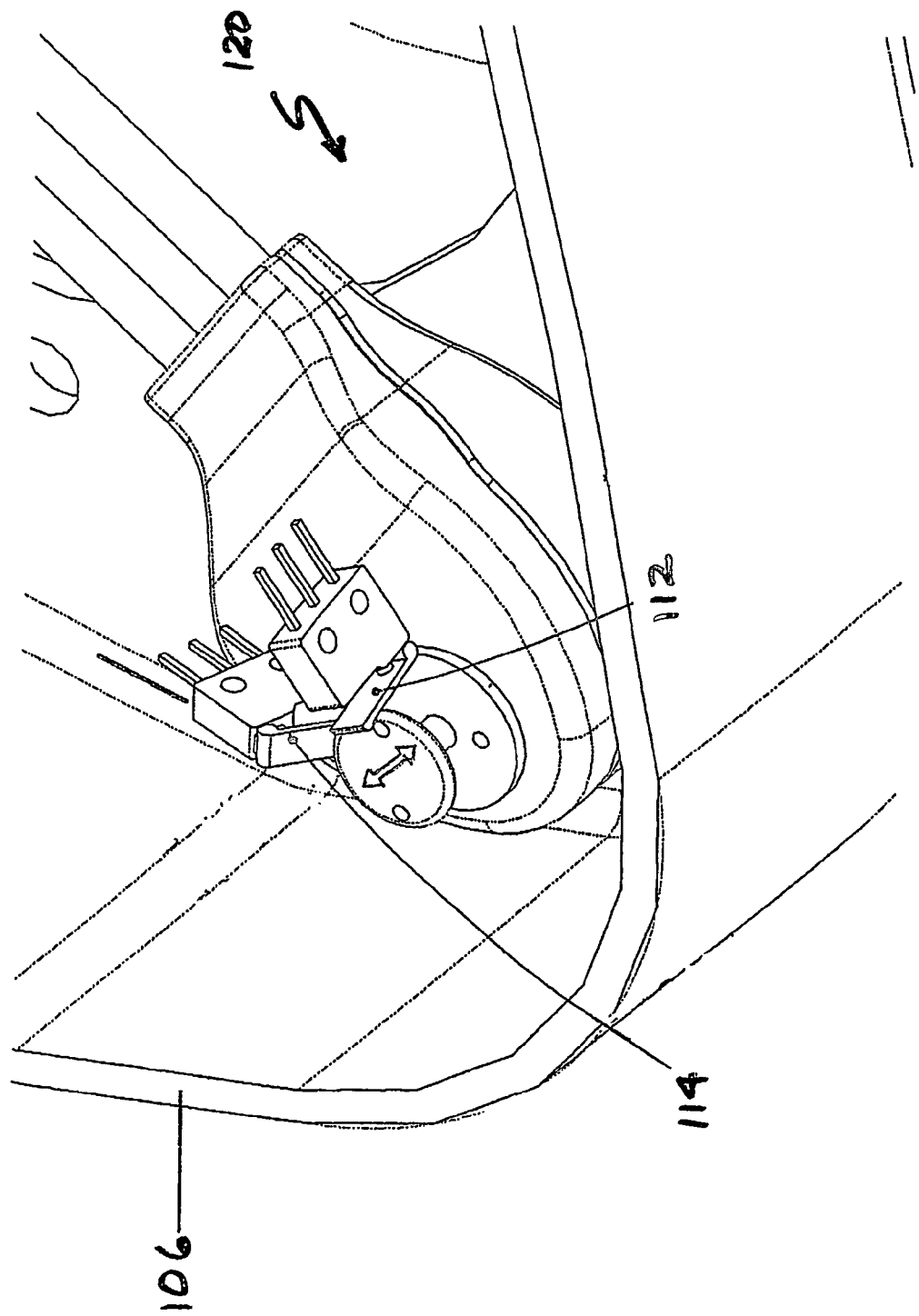
FIG. 11 is a view of the same assembly as that in FIG. 10, rotated through around ninety degrees.

Turning now to FIGS. 10 and 11, micro switch assembly 120 can be integrated with, for example, the assembly shown in FIG. 5 in any suitable way. For example, assembly 120 can be fitted within top cover 106 in FIG. 5, with cap 108 being integrated in assembly 120 as shown in FIGS. 10 and 11.

Assembly 120 includes first micro switch 112 and second micro switch 114, as well as integrated microprocessor 116, for switching via a data bus. In both FIGS. 10 and 11, override button 110, which is in effect an extension of screw 82 in FIG. 5, is shown in the "up" position with reference to FIGS. 10 and 11. This corresponds with the "down" position in FIG. 5. In this position, screw 82 is locked. Micro switch 112 is closed in this position, while micro switch 114 is open.

If screw 82 was in the release position, override button 110 would be "up" with reference to FIG. 5 and "down" with reference to FIGS. 10 and 11. In this configuration, micro switch 112 would be open and micro switch 114 would be closed.

Figure 12:
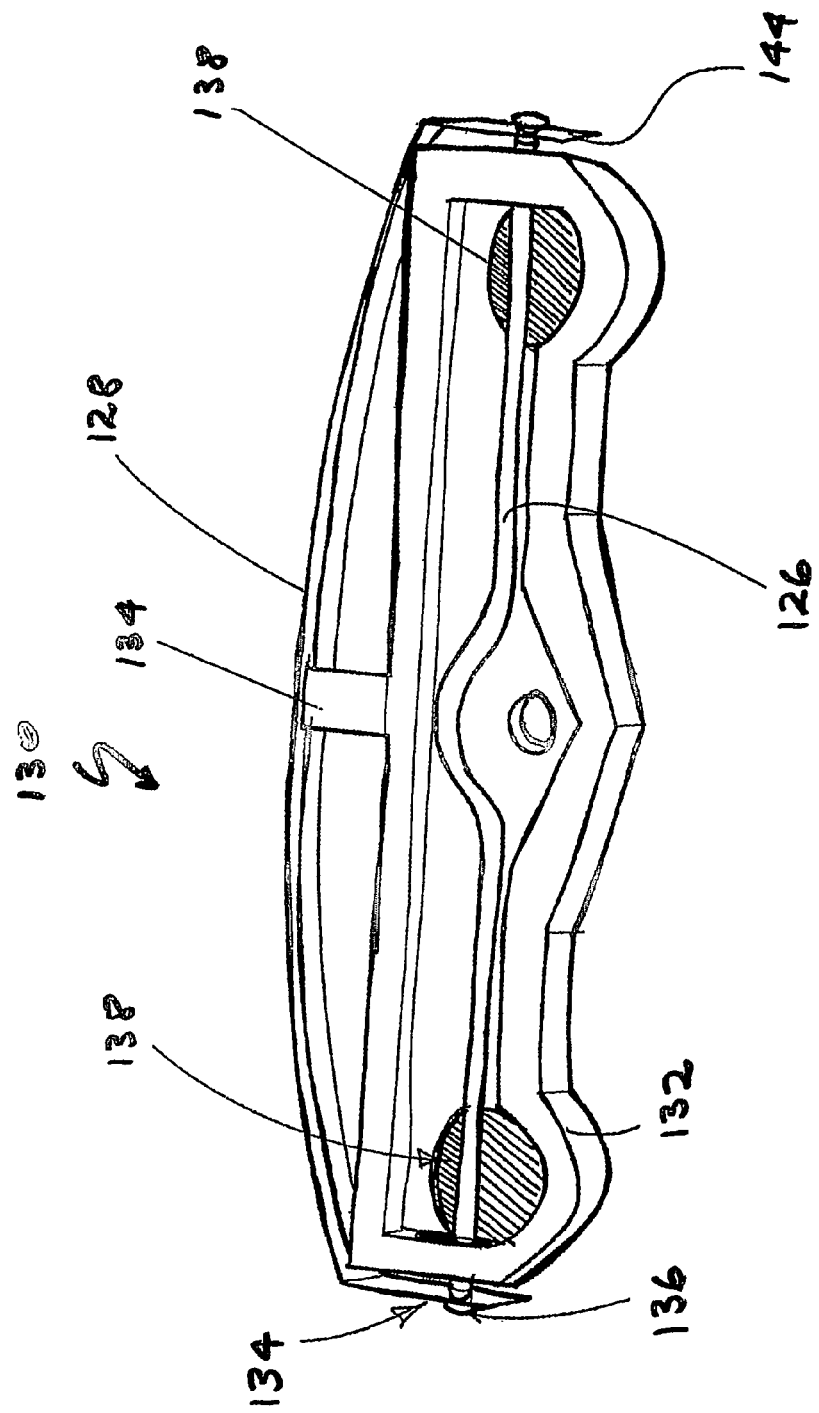
FIG. 12 is a perspective view of a first embodiment of the fastener assembly of the invention in its second aspect.

With reference now to the embodiment of the invention in its second aspect in FIGS. 12 and 13, fastener assembly 130 is intended to releasably secure an element such as air bag 118 (refer FIG. 15). Air bag 118 in this embodiment has four posts 122, one of which is shown in larger scale in FIG. 14. Post 112 includes groove 124.

Fastener assembly 130 includes a bar, in this embodiment in the form of wire 126, which is biased into engagement with groove 124 in situ. Attached to each end of wire 126 is shape memory spring 128 which is held proud of support 132 by brace 134.

Plastic caps 136 prevents spring 128 from shorting out fastener assembly support 132.

Fastener assembly 130 includes apertures 138 to receive posts 122.

As illustrated in FIG. 13, fastener assembly 130 can be fixed to removable cap 140. Cable connectors 142 attach to ends 144 of shape memory spring 128, to provide the necessary energy to actuate shape memory spring 128 and cause it to shrink.

As it will be appreciated, when sufficient energy, in the form of heat, is supplied to shape memory spring 128 via cable connectors 142, spring 128 contracts. Since it is braced against brace 134, spring 128, in the contracted form, will draw the ends of wire 126 out of engagement with grooves 124 in posts 122, thus permitting release of air bag 118.

It is advantageous that fastener assembly 130 may be retrofitted to existing air bag assemblies.

Turning now to FIGS. 16 to 18, fastener 210 has a pin 212 adapted to be received in aperture 214. Latch 216 locks pin 212 by entering groove 218. Latch 216 is connected to shape memory alloy wire 220 which passes from anchor point 222 over guide 224 to end 226 of latch 216. When shape memory alloy wire 220 is heated sufficiently, it contracts, drawing on end 226 of latch 216 and hence drawing latch 216 out of engagement in groove 218, unlocking pin 212.

Pin 212 has first taper 228 and second taper 230. Second taper 230 expands to form flange 232. In FIGS. 17 and 18 it can be seen that flange 232 is attached to element 234. Pin 212 may of course be integral with element 234.

INDUSTRIAL APPLICABILITY

It will be appreciated that the fasteners of the present invention can be "blind" fixed and therefore may be highly tamper-resistant. It is possible to manufacture the fasteners of the invention at very small cost and they can be easily integrated into existing vehicle electronic systems. The fasteners of the invention can be designed so they provide visual evidence of tampering. It is also possible to provide for manual operation of the fastener in appropriate circumstances.

As will be readily appreciated by those skilled in the various arts, the inventions disclosed herein are not limited to the example set out and have wide applications in many areas. These inventions represent significant advances in the relevant arts.

The invention claimed is:

1. A fastener for releasably securing a first element to a second element in a spaced-apart relationship, the fastener comprising:
    (a) a locking pin moveable between a locked position in which the first element is secured in spaced relationship to the second element and a release position in which the first element is released from the spaced relationship with the second element, the locking pin having an engageable head;
    (b) means for engaging the head of the locking pin with the second element;
    (c) bias means influencing said second element away from said first element; and
    (d) an actuator comprising or including shape memory alloy adapted to elongate upon application of appropriate energy;
    wherein the actuator is adapted, when elongated, to cause the locking pin to move to the release position.

2. The fastener of claim 1, which also comprises an integrated processor, a switch and one or more sensors.

3. The fastener of claim 2, in which the sensor is adapted to sense whether the locking pin is in the locked position or the release position.

4. The fastener of claim 3, in which the sensor is adapted to be activated by the locking pin or an extension of the locking pin.

5. The fastener of claim 1, wherein the locking pin is made of polymeric material.

6. The fastener of claim 1, wherein the locking pin has an internal cavity adapted to receive a guide pin.

7. The fastener of claim 1, wherein the means for engaging the head of the locking pin with the second element comprises a clip.

8. The fastener of claim 7, wherein the clip is annular.

9. The fastener of claim 7, wherein the clip is in two or more parts.

10. The fastener any of claim 7, wherein the clip is made of elastic material.

11. The fastener of claims 1, wherein the locking pin has a shaft of narrower cross-section than the head of said locking pin.

12. The fastener of claim 11, wherein the locking pin is adapted to move to the release position after the engagement means has disengaged the head of said locking pin.

13. The fastener of claim 1 when assembled onto the first element.

14. The fastener of claims 1, wherein the bias means influencing said second element away from said first element is a coiled spring.

15. The fastener claims 1, wherein the actuator is a single coiled spring made of shape memory alloy.

16. The fastener of claim 15, wherein the actuator is adapted to elongate by energy provided from an energy source.

17. The fastener of claim 16, wherein there is a cable connection between the energy source and the actuator.

18. The fastener of claim 16, wherein the energy is in the form of infra red light or ultrasound.

19. The fastener of claims 1, wherein the locking pin is adapted to default to the locked position.

20. The fastener of claims 1, which comprises a second actuator.

21. The fastener of claim 20, wherein the second actuator comprises shape memory alloy adapted to elongate upon application of appropriate energy to cause the locking pin to move to the locked position.

22. The fastener of claims 1, which comprises a detent adapted to hold the locking pin in the locked and/or release position.

23. The fastener of claim 22, wherein the detent is adapted to clip into a groove in the locking pin when the locking pin is in the release position, the engagement between the detent and the groove being adapted to prevent the locking pin moving towards the locked position without positive actuation.

24. The fastener of claims 1, wherein the locking pin is adapted to move from the locked position to the release position irreversibly.

25. The fastener of claims 1, wherein the actuator is adapted to cause the locking pin to move to the locked position when no longer elongated.

26. The fastener of claims 1, which also comprises means to communicate with at least one slave fastener.

27. The fastener of claim 26, wherein the communication means is adapted to communicate with the slave fastener when the locking pin has been caused to move to the release position.

28. The fastener of claims 1, wherein the fastener has an address.

29. The fastener of claim 28, wherein the address is encrypted.

30. The fastener of claims 1, wherein the fastener includes means for enabling the fastener to recognize an authorised operator.

31. The fastener of claims 1, wherein the locking pin is adapted to be moved to the release position manually.

32. A fastener assembly for releasably securing an element, the element comprising a post or pin having a groove, the assembly comprising a bar adapted to engage the groove to secure the element, the assembly also comprising a connecting means having first and second ends, the first end being attached to an end of the bar and the second end being attached to an anchor point, the connecting means comprising of shape memory material which, upon application of suitable energy, is adapted to change shape and draw the bar out of engagement with the groove, thus releasing the element, wherein the assembly also comprises a brace for the connecting means positioned between the first and second ends of the connecting means.

33. The fastener assembly of claim 32, wherein the element has more than one post or pin, each having a groove.

34. The fastener assembly of claim 33, wherein the bar is adapted to engage the groove in more than one post or pin.

35. The fastener assembly of claim 34, wherein the bar engages the groove in each of two posts or pins.

36. The fastener of claims 32, wherein the connecting means is a shape memory wire.

37. The fastener assembly of claim 36, wherein the shape memory wire is a titanium-nickel wire.

38. The fastener of claims 36, wherein said anchor point is the other end of the bar and said connecting means is adapted to change shape by shrinking to draw the bar out of engagement with the groove.

39. The fastener of claims 32, wherein the bar is biased into engagement with the groove.

* * * * *